United States Patent
Jeon

(10) Patent No.: US 10,051,352 B2
(45) Date of Patent: Aug. 14, 2018

(54) APPARATUS AND METHOD FOR CONTROLLING A SPEAKER GRILL IN A VEHICLE

(71) Applicant: Hyundai Motor Company, Seoul (KR)

(72) Inventor: Young Tak Jeon, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/334,802

(22) Filed: Oct. 26, 2016

(65) Prior Publication Data

US 2017/0155989 A1    Jun. 1, 2017

(30) Foreign Application Priority Data

Nov. 26, 2015    (KR) .......................... 10-2015-0166178

(51) Int. Cl.
| | | |
|---|---|---|
| *H04B 1/00* | (2006.01) | |
| *H04R 1/02* | (2006.01) | |
| *B60K 35/00* | (2006.01) | |

(52) U.S. Cl.
CPC ............. *H04R 1/026* (2013.01); *H04R 1/023* (2013.01); *B60K 35/00* (2013.01); *H04R 2201/025* (2013.01); *H04R 2400/11* (2013.01); *H04R 2499/13* (2013.01)

(58) Field of Classification Search
CPC .... H04R 2499/13; H04R 1/023; H04R 1/025; H04R 1/026; H04R 1/02; H04R 1/086; H04R 1/2834; H04R 1/403; H04R 1/2888; H04R 2201/021; H04R 2201/025; H04R 29/001; H04R 3/00; H04R 3/04; H04R 3/14; B60N 2/4876; B60R 11/0217

USPC ............. 381/391, 86, 332, 389, 59; 181/199
See application file for complete search history.

(56) References Cited

U.S. PATENT DOCUMENTS

| | | | |
|---|---|---|---|
| 9,036,857 B2 | 5/2015 | Zellner, Jr. et al. | |
| 2010/0135516 A1* | 6/2010 | Saiki .................... | H04R 1/2811 |
| | | | 381/386 |

FOREIGN PATENT DOCUMENTS

| | | | |
|---|---|---|---|
| JP | 1994-051788 | | 2/1994 |
| JP | 1994-062696 U | | 9/1994 |
| JP | 1998-178690 | | 7/1996 |
| JP | 2000-025533 | * | 1/2000 |
| JP | 2000-025533 A | | 1/2000 |
| JP | 2011-023783 A | | 2/2011 |
| JP | 2013-183372 | | 9/2013 |
| KR | 10-1997-0038816 | | 7/1997 |
| KR | 10-1997-0058261 | | 7/1997 |
| KR | 10-2000-0015711 | | 3/2000 |
| KR | 20-2000-0007239 U | | 4/2000 |
| KR | 10-2002-0049257 A | | 6/2002 |
| KR | 2002-0049257 | * | 6/2002 |

\* cited by examiner

*Primary Examiner* — Norman Yu
(74) *Attorney, Agent, or Firm* — Mintz Levin Cohn Ferris Glovsky and Popeo, P.C.; Peter F. Corless

(57) ABSTRACT

A method of controlling a speaker grill of a speaker including a play unit separable from the speaker grill in a vehicle includes: collecting at least one of information outputted by a sensor equipped in the vehicle and information indicating an operating state of a device equipped in the vehicle; determining an opening ratio of the speaker grill of the speaker based on the collected information; and controlling a motor device coupled to the speaker grill to achieve the opening ratio.

17 Claims, 10 Drawing Sheets

APPARATUS AND METHOD FOR CONTROLLING A SPEAKER GRILL IN A VEHICLE

CROSS-REFERENCE TO RELATED APPLICATION

Pursuant to 35 U.S.C. § 119(a), this application claims the benefit of an earlier filing date and right of priority to Korean Application No. 10-2015-0166178, filed on Nov. 26, 2015, the contents of which are hereby incorporated by reference herein in their entirety.

BACKGROUND

Technical Field

The present disclosure relates generally to an apparatus and method for controlling a grill of a speaker in a vehicle, and more particularly, to an apparatus and method for controlling a speaker grill in accordance with an in-vehicle environment and an operating state.

Discussion of the Related Art

Multimedia systems installed in a vehicle can implement various systems, such as an audio system, a car stereo system, a navigation system, or the like, by outputting audio through a speaker. The speaker may include a unit for playing sound that is divided into several units including, for example, a low/high pitched sound unit (2-way) for playing low-pitched sound and high-pitched sound on full band, a low/middle/high pitched sound unit (3-way) for playing low-pitched sound, middle-pitched sound and high-pithed sound, a 4-way unit for playing low-pitched sound, middle-pitched sound, high-pitched sound and ultrahigh-pitched sound, etc. In luxury vehicles, a speaker may be disposed at a specific location and set to be responsible for a specific frequency band in order to output frequency on low/middle/high-pitched sound band. For instance, a tweeter (high-pitched sound) speaker can be installed as a speaker of a vehicle and midrange (middle-pitched and low-pitched sound) speakers can be installed as dashboard and door speakers.

Regarding a speaker for vehicle, unlike a general home speaker, a speaker is fixed to an interior space of the vehicle and a speaker grill, a nonwoven fabric, and the like are placed over the speaker (or, a part that can be reached by a vehicle user) to prevent dust or water from entering the speaker. In particular, a speaker is generally configured to be protected by a speaker grill. A multitude of holes are formed in the typical speaker grill to deliver audio or sound played by the speaker to an interior space of the vehicle. Such a nonwoven fabric or a speaker grill, however, may interrupt audio output performance.

Generally speaking, a speaker grill should be capable of delivering a sound quality of a speaker into a space while maintaining the original sound quality. In this regard, a thickness of a speaker grill, a size/pitch of holes therein, an opening ratio, and the like can be considered as factors that affect a speaker sound quality (i.e., performance). Hence, when a speaker grill is manufactured, an opening ratio can be improved by reducing a thickness of a speaker grill to the maximum and decreasing a size and/or a pitch of a hole therein.

SUMMARY

Embodiments of the disclosure are directed to an apparatus and method for controlling a grill of a speaker in a vehicle that substantially obviate one or more problems due to limitations and disadvantages of the related art.

An object of the present disclosure is to provide an apparatus and method for controlling a grill of a speaker in a vehicle, by which a grill of a speaker can be automatically opened and closed.

Another object of the present disclosure is to provide an apparatus and method for controlling a grill of a speaker in a vehicle, by which an audio output in an environment can be maximized by opening and closing the grill of a speaker.

A further object of the present disclosure is to provide an apparatus and method for controlling a grill of a speaker in a vehicle, by which a speaker not in use can be protected by preventing inflow of dust, water, and the like by opening and closing the grill of the speaker.

Another object of the present disclosure is to provide a speaker for a vehicle, which has grills in various shapes because limitations according to a grill thickness, a hole size, a hole pitch, an opening ratio, and the like are reduced by opening the grill in an environment with a speaker.

Technical tasks obtainable from the present disclosure are not limited by the above-mentioned technical tasks, and other unmentioned technical tasks can be clearly understood from the following description by those having ordinary skill in the technical field to which the present disclosure pertains.

Additional advantages, objects, and features of the disclosure will be set forth in the disclosure herein as well as the accompanying drawings. Such aspects may also be appreciated by those skilled in the art based on the disclosure herein.

To achieve these objects and other advantages and in accordance with the purpose of the disclosure, as embodied and broadly described herein, a method of controlling a speaker grill of a speaker including a play unit separable from the speaker grill in a vehicle according to embodiments of the present disclosure includes: collecting at least one of information outputted by a sensor equipped in the vehicle and information indicating an operating state of a device equipped in the vehicle; determining an opening ratio of the speaker grill of the speaker based on the collected information; and controlling a motor device coupled to the speaker grill to achieve the opening ratio.

The sensor may include a door sensor, and the information outputted by the door sensor may include at least one of a door-open signal, a door-closed signal, a door lock signal, and a door unlock signal.

The step of controlling the motor device may include the steps of controlling the speaker grill to cover the play unit in response to collecting at least one of the door-closed signal and the door lock signal and controlling the speaker grill to separate from a top side of the play unit in response to collecting at least one of the door-open signal and the door unlock signal.

The sensor may include a seating sensor, and the information outputted by the seating sensor may include at least one of a driver-seated signal and a passenger-seated signal.

The step of controlling the motor device may include the steps of controlling the speaker grill to separate from a top side of the play unit when the driver-seated signal or the passenger-seated signal is activated, and controlling the speaker grill to cover the play unit the driver-seated signal or the passenger-seated signal is deactivated.

The sensor may include a humidity sensor configured to measure humidity in the vehicle, and the information outputted by the sensor may include a humidity signal indicating that the measured humidity is greater than or equal to a reference amount.

The step of controlling the motor device may include the steps of controlling the speaker grill to separate from a top side of the play unit the humidity signal is deactivated and controlling the speaker grill to cover the play unit the humidity signal is activated.

The operating state of the device may include at least one of an OFF state, an accessory driven state (ACC), an electronic system driven state (ON), and an ignition state (IGN).

The step of controlling the motor device may include the steps of controlling the speaker grill to cover the play unit in response to determining that the device is in the OFF state, and controlling the speaker grill to separate from a top side of the play unit in response to determining that the device is in at least one of the accessory driven state (ACC), the electronic system driven state (ON), and the ignition state (IGN).

The operating state may be determined based on whether an audio-video-navigation device is in operation.

The step of controlling the motor device may include the steps of controlling the speaker grill to cover the play unit in case of turning off the audio-video-navigation device equipped in the vehicle, and controlling the speaker grill to separate from a top side of the play unit in case of turning on the audio-video-navigation device.

The method may further include the step of controlling the speaker grill to cover the play unit when a predetermined situation occurs even though the speaker grill has been separated from a top side of the play unit.

The preset situation may include at least one of a case that a door-open signal is activated during driving of the vehicle, a case that shock is sensed by a collision detection sensor installed in the vehicle, and a case that a signal of an airbag installed in the vehicle is activated.

The step of controlling the motor device may include the step of outputting energy in a form of direct motion or rotary motion to cause movement of the speaker grill.

Furthermore, in accordance with embodiments of the present disclosure, an apparatus for controlling a speaker grill of a speaker including a play unit separable from the speaker grill in a vehicle includes: a processing system that comprises at least one data processor and at least one computer-readable memory storing program instructions, which when executed by the data processor cause the processing system to operate as: a collection unit collecting at least one of information outputted by a sensor equipped in the vehicle and information indicating an operating state of a device equipped in the vehicle; a decision unit determining an opening ratio of the speaker grill of the speaker based on the collected information; and a control unit controlling a motor device coupled to the speaker grill to achieve the opening ratio.

Furthermore, in accordance with embodiments of the present disclosure, a non-transitory computer-readable recording medium may include the method of controlling a grill of a speaker in a vehicle described above, wherein the method is recorded as program instructions in the recording medium.

Furthermore, in accordance with embodiments of the present disclosure, an apparatus of controlling a grill of a speaker in a vehicle according to another embodiment of the present invention may include a collection unit configured to collect at least one information from an output of a sensor installed in the vehicle and an operating state of a device installed in the vehicle, a decision unit configured to determine an opening ratio of a speaker grill in the speaker including a play unit separable from the speaker grill to correspond to the collected information, and a control unit configured to control a motor device connected to the speaker grill to correspond to the opening ratio.

The sensor may include a door sensor and the information outputted through the door sensor may include at least one of a door-open signal, a door-closed signal, a door lock signal and a door unlock signal.

The control unit may be configured to control the speaker grill to cover the play unit in response to at least one of the door-closed signal and the door lock signal and control the speaker grill to get away from a top side of the play unit in response to at least one of the door-open signal and the door unlock signal.

The sensor may include a seating sensor and the information outputted through the seating sensor may include at least one of a driver-seated signal and a passenger-seated signal.

The control unit may be configured to control the speaker grill to get away from a top side of the play unit in case of activation of the driver-seated signal or the passenger-seated signal and control the speaker grill to cover the play unit in case of deactivation of the driver-seated signal or the passenger-seated signal.

The sensor comprises a humidity sensor configured to measure humidity in the vehicle and the information outputted through the humidity sensor may include a humidity signal indicating that the measured humidity is equal to or greater than a reference.

The control unit may be configured to control the speaker grill to get away from a top side of the play unit in case of deactivation of the humidity signal and control the speaker grill to cover the play unit in case of activation of the humidity signal.

The operating state may include at least one of OFF state, accessory driven state (ACC), electronic system driven state (ON), and ignition state (IGN).

The control unit maybe configured to control the speaker grill to cover the play unit in response to the OFF state and control the speaker grill to get away from a top side of the play unit in response to at least one of the accessory driven state (ACC), the electronic system driven state (ON), and ignition state (IGN).

The operating state may be determined depending on whether an audio-video-navigation device operates or not.

The control unit may be configured to control the speaker grill to cover the play unit in case of turning off the audio-video-navigation device and control the speaker grill to get away from a top side of the play unit in case of turning on the audio-video-navigation device.

The control unit may be further configured to control the speaker grill to cover the play unit in case of occurrence of a preset situation despite a case that the speaker grill has got away from a top side of the play unit.

The preset situation may be delivered through the collection unit and may include at least one of a case that a door-open signal is activated in the course of driving the vehicle, a case that shock is sensed by a collision detection sensor installed in the vehicle, and a case that a signal of an airbag installed in a vehicle is activated.

The control unit may be configured to output energy of one of direct motion and rotary motion for movement of the speaker grill.

Furthermore, in accordance with embodiments of the present disclosure, a speaker in a vehicle includes: a play unit that is operable to play audio, and a speaker grill configured to protect the play unit, the speaker grill including: an outer region corresponding to an installation region of the speaker in the vehicle and a frame having the play unit installed therein and a center region corresponding to a top side of the play unit in the frame. The outer region and the center region are separable from each other.

The center region may move to correspond to energy of either direct motion or rotary motion of a motor device.

The center region may include at least one slice and may be configured to move by at least one selected from the group consisting of a sliding door system, a blind system, a revolving door system.

If the play unit outputs the audio, the center region may separate (i.e., move (or be moved) away) from the top side of the play unit. If the play unit does not output the audio, the center region may be located over the top side of the play unit.

If the center region is located over the top side of the play unit, an opening ratio of the speaker grill may be less than or equal to 50%. If the center region gets away from the top side of the play unit, the opening ratio of the speaker grill may be greater than 50%.

Further scope of applicability of the present disclosure will become apparent from the detailed description given hereinafter. However, it should be understood that the detailed description and specific examples, while indicating embodiments of the disclosure, are given by illustration only, since various changes and modifications within the spirit and scope of the disclosure will become apparent to those skilled in the art from this detailed description.

Accordingly, embodiments of the present disclosure provide various effects and/or features.

First of all, since a speaker grill (e.g., an outer grill and/or an inner grill) can be automatically opened/closed using an external signal (e.g., a trigger signal for opening/closing a speaker grill automatically), sound quality enhancement of the speaker while preventing water/dust inflow can be provided.

Secondly, a freely designed speaker grill can be provided unlike an existing built-in speaker grills.

Effects obtainable from the present disclosure may be non-limited by the above mentioned effect. And, other unmentioned effects can be clearly understood from the following description by those having ordinary skill in the technical field to which the present disclosure pertains.

BRIEF DESCRIPTION OF THE DRAWINGS

The present disclosure will become more fully understood from the detailed description given herein below and the accompanying drawings, which are given by illustration only, and thus are not limitative of the present disclosure, and wherein.

DETAILED DESCRIPTION OF THE DISCLOSURE

Figure 1:
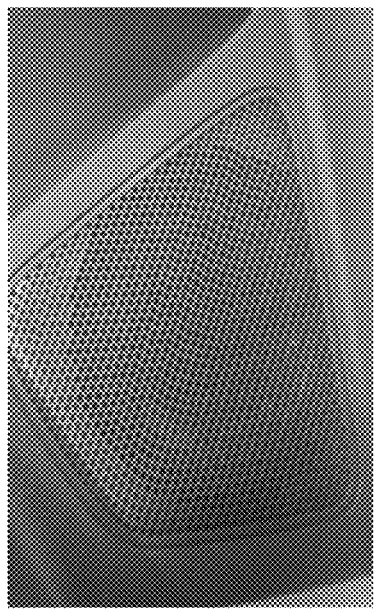
FIG. 1 is a diagram describing speaker grills for a vehicle.
Figure 1:
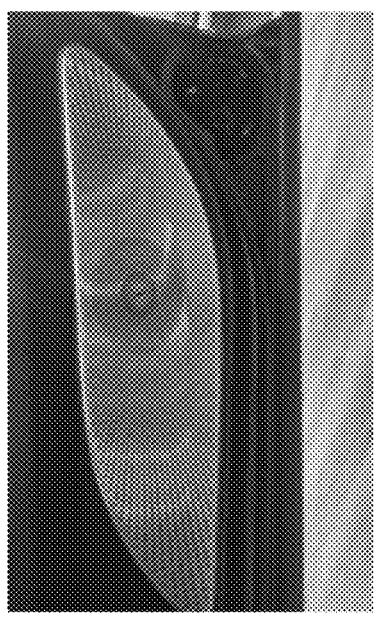
Figure 1:
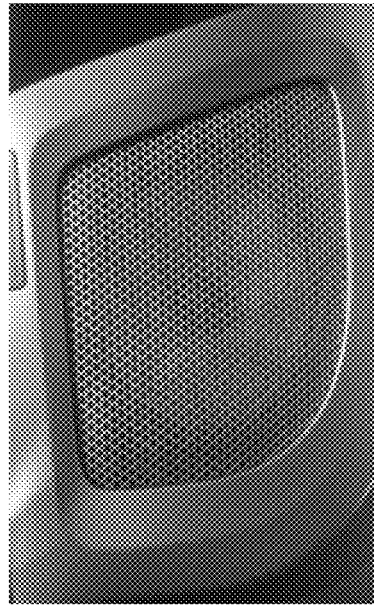

Description will now be given in detail according to embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function.

In the description of embodiments, if it is disclosed that one component is formed "over (above) or under (below)" another component, "over (above) or under (below)" includes both a case that two components come in contact with each other in direct and a case that a new component is disposed between the two components. And, the representation "over (above) or under (below)" may mean that a downward direction is included as well as an upward direction with reference to one component.

The terms "a" or "an", as used herein, are defined as one or more than one. The term "another", as used herein, is defined as at least a second or more. The terms "including" and/or "having" as used herein, are defined as comprising (i.e., open transition). The term "coupled" or "operatively coupled" as used herein, is defined as connected, although not necessarily directly, and not necessarily mechanically.

In the description of the disclosure, certain detailed explanations of related art are omitted when it is deemed that they may unnecessarily obscure the essence of the disclosure. The features of the disclosure will be more clearly understood from the accompanying drawings and should not be limited by the accompanying drawings. It is to be appreciated that all changes, equivalents, and substitutes that do not depart from the spirit and technical scope of the disclosure are encompassed in the disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by a processing system. The term "processing system" may refer to a hardware device that includes a computer-readable memory and at least one data processor. The memory is configured to store program instructions, and the at least one data processor is specifically programmed to execute the program instructions to perform one or more processes which are described further below. Moreover, it is understood that the below methods may be executed by an apparatus comprising the processing system in conjunction with one or more other components, as would be appreciated by a person of ordinary skill in the art.

Furthermore, the processing system of the present disclosure may be embodied as non-transitory computer readable media containing executable program instructions executed by a processor, controller, or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Referring now to the presently disclosed embodiments, FIG. 1 is a diagram depicting speaker grills for a vehicle.

As shown in FIG. 1, a vehicle speaker grill has a fixed design and loaded in a vehicle in a manner of being built in a corresponding vehicle. Hence, once a design of a speaker grill is determined, it is difficult to change the design. An opening ratio of a speaker grill can be calculated according to a hole size of a grill. In case of a speaker grill shown in (a) of FIG. 1, an opening ratio amounts to about 13.5%. In case of a speaker grill shown in (b) of FIG. 1, an opening ratio amounts to about 45%. In case of a speaker grill shown in (c) of FIG. 1, an opening ratio amounts to about 50%.

A speaker grill may employ a design of a low opening ratio in order to prevent inflow of dust or water or use nonwoven fabric. Yet, since a case of high frequency has short vibration periodicity, if a thickness of a speaker grill is great, audio output is considerably affected. Alternatively, a speaker grill formed of metal may be available instead of a nonwoven fabric that interrupts audio output considerably. In order to reduce thickness of a speaker grill, a grill formed of SUS (steel use stainless) corresponding to a sort of metal may be available.

Figure 2:
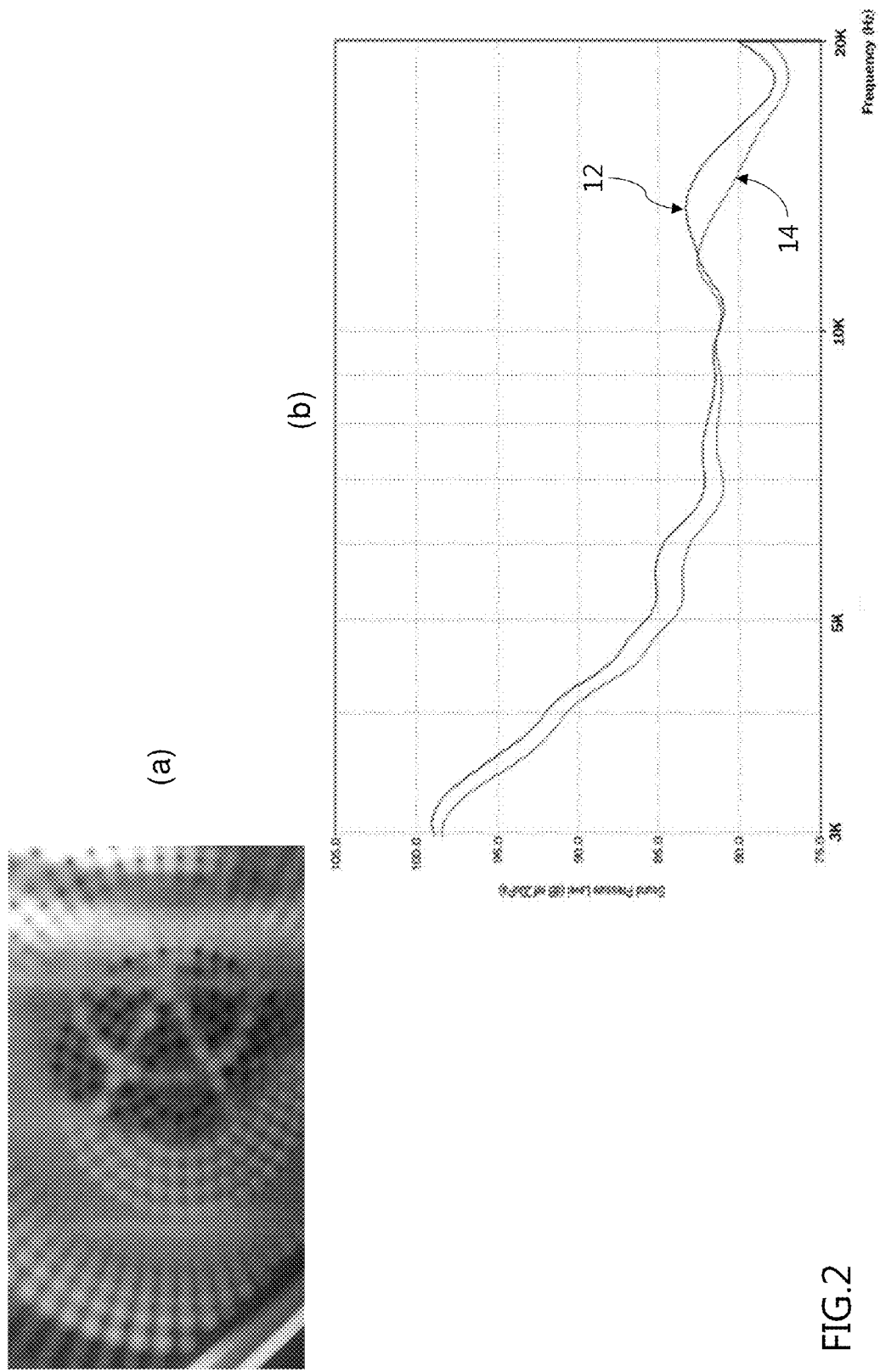
FIG. 2 is a diagram comparing a case of applying nonwoven fabric to a vehicle speaker grill to a case of not applying nonwoven fabric to a vehicle speaker grill.

FIG. 2 is a diagram comparing a case of applying nonwoven fabric to a vehicle speaker grill to a case of not applying nonwoven fabric to a vehicle speaker grill. In particular, (a) of FIG. 2 shows one example of a speaker grill having nonwoven fabric applied to a rear surface of the metal grill that includes holes. Meanwhile, (b) of FIG. 2 shows a measurement result of sound pressure level (SPL) of a speaker according to a frequency range in a nonwoven fabric applied case 14 and a nonwoven fabric non-applied case 12.

Referring to (b) of FIG. 2, it can be observed that the nonwoven fabric applied case 14 has a sound pressure level (SPL) lower than that of the nonwoven fabric non-applied case 12 by 1~2 dB on most of the frequency bands (3K~20K Hz). In particular, it can be regarded that the sound outputted from a speaker in the nonwoven fabric non-applied case 12 is delivered better than the sound outputted from the speaker in the nonwoven fabric applied case 14.

Yet, for the sound delivery, if nonwoven fabric is not used for a speaker grill, as an inner space of the speaker grill is exposed through holes formed in the speaker grill, it is not preferable in aspect of an aesthetic appreciation. And, dust and the like may flow in the inner space.

Figure 3:
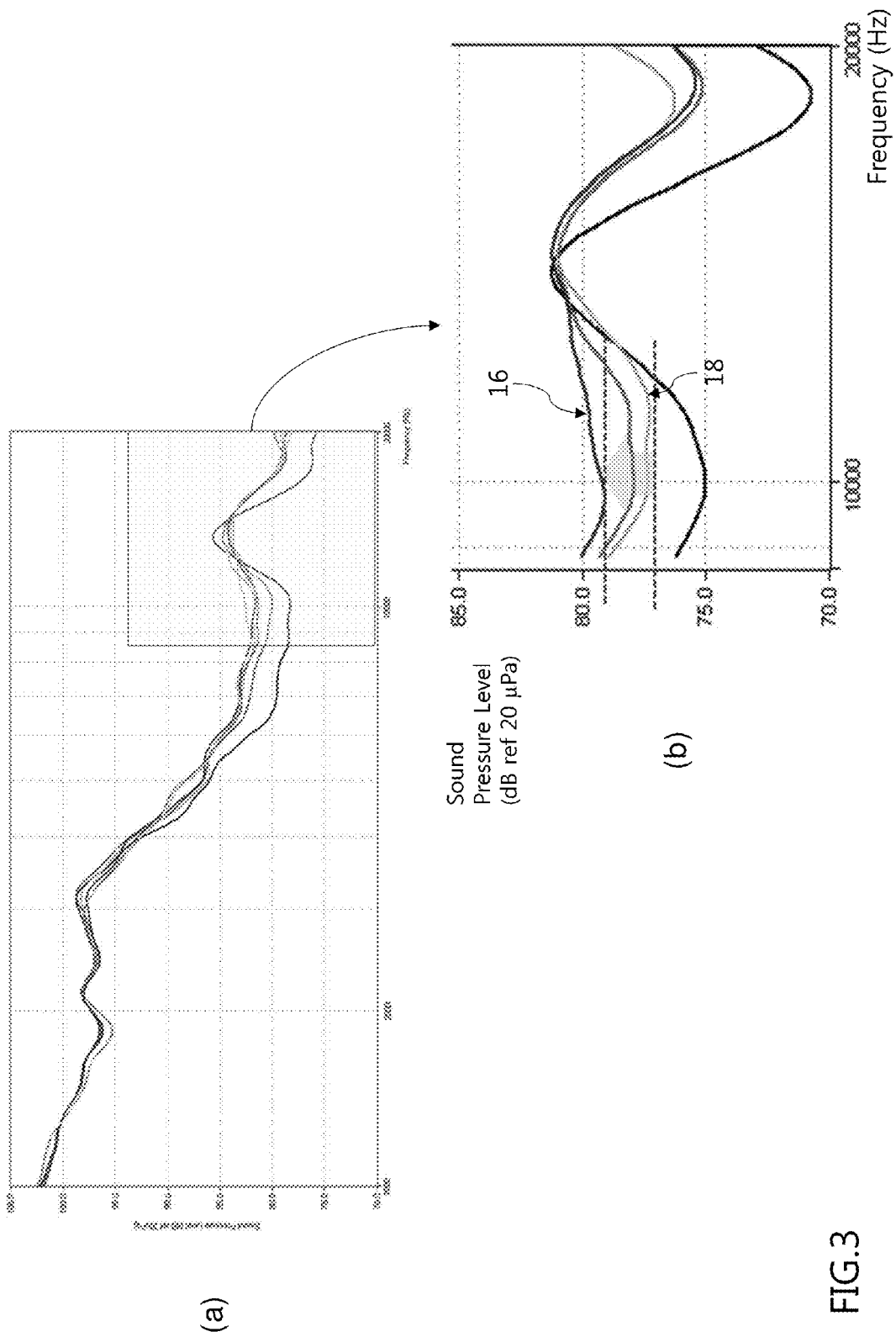
FIG. 3 is a diagram comparing a case of applying a rib for reinforcement to a vehicle speaker to a case of not applying a rib for reinforcement to a vehicle speaker.

FIG. 3 is a diagram comparing a case of applying a rib for reinforcement to a vehicle speaker to a case of not applying a rib for reinforcement to a vehicle speaker. In (a) of FIG. 3, the result of measurements of sound pressure levels (SPL) of a speaker is shown according to a frequency range in a case 18 of applying a rib for reinforcement to the speaker and a case 16 of not applying. Also, (b) of FIG. 3 shows an enlarged specific frequency band in the result shown in (a) of FIG. 3.

If a rib for reinforcement is applied, a portion for outputting sound may be blocked by the rib in part, whereby an opening ratio may be lowered. Referring to (b) of FIG. 3, it can be observed that an SPL of a speaker including a rib for reinforcement is measured lower than that of a speaker failing to include the rib. And, it can be observed that an SPL of a speaker on a specific frequency band (e.g., a band around 1K Hz) is lowered relatively and considerably. Yet, the test result may vary depending on a rib for reinforcement and a speaker grill structure.

Figure 4:
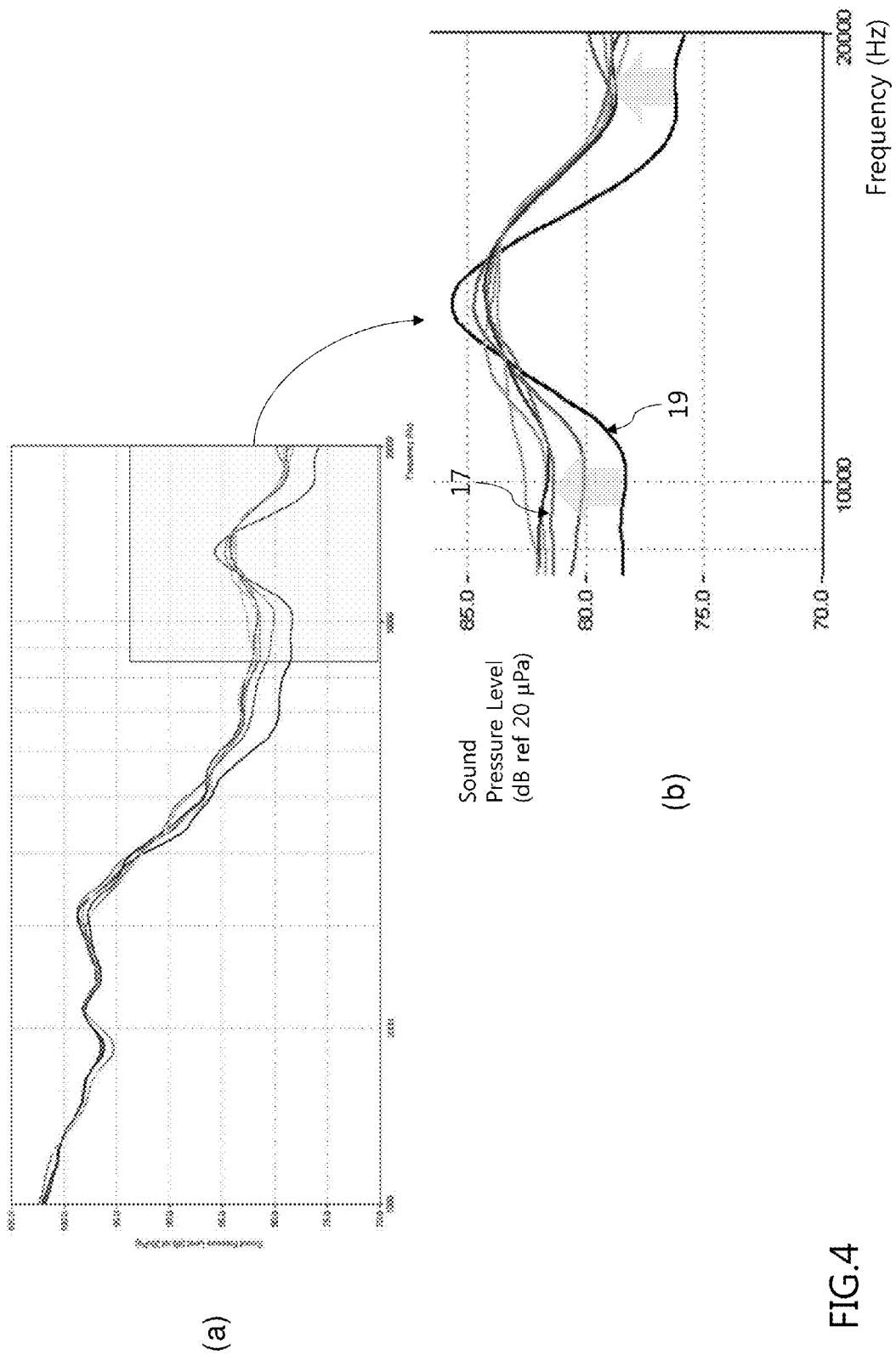
FIG. 4 is a diagram comparing a speaker's sound pressure levels (SPL) according to the thickness of the vehicle speaker grill.

FIG. 4 is a diagram comparing a speaker's sound pressure levels (SPL) according to the thickness of the vehicle speaker grill.

In particular, (a) and (b) of FIG. 4 show results of measurement on a speaker grill not using nonwoven fabric. More particularly, (a) of FIG. 4 shows the result of measurements of sound pressure levels (SPL) of a speaker according to a frequency range in a case 19 of using a speaker grill formed by injection molding using plastic ABS resin and a case 17 of using a speaker grill formed of stainless steel (SUS). And, (b) of FIG. 4 shows an enlarged specific frequency band in the result shown in FIG. 4. In this case, the ABS resin is a generic term of a sort of shock withstand thermoplastic resin consisting of 3 components including acrylonitrile, butadiene and styrene and can be abbreviated to ABS by taking first letters of the 3 components.

An opening ratio of a speaker grill used in the case 19 of using a speaker grill formed by injection molding using plastic ABS resin is about 43% and a thickness thereof is about 2.5 T (mm). On the other hand, an opening ratio of a speaker grill used in the case 17 of using a speaker grill formed of stainless steel (SUS) is about 38% and a thickness thereof is about 0.6 T (mm). Unlike the plastic ABS resin, a rib for reinforcement is included.

Referring to (b) of FIG. 4, it can be observed that the case of the speaker grill using stainless steel (SUS) with a low opening ratio by including a rib for reinforcement has a sound pressure level (SPL) of a speaker, which gets considerably lower than that of the case of the speaker grill using the plastic ABS resin with a high opening ratio without a rib, on a specific frequency band (e.g., 1K and 2K Hz periphery band). Yet, the text result may vary depending on a rib for reinforcement and a structure of a speaker grill. Such a result may be considered as attributed to a thickness difference between a speaker grill of plastic ABS resin and a speaker grill using stainless steel (SUS).

Figure 5:
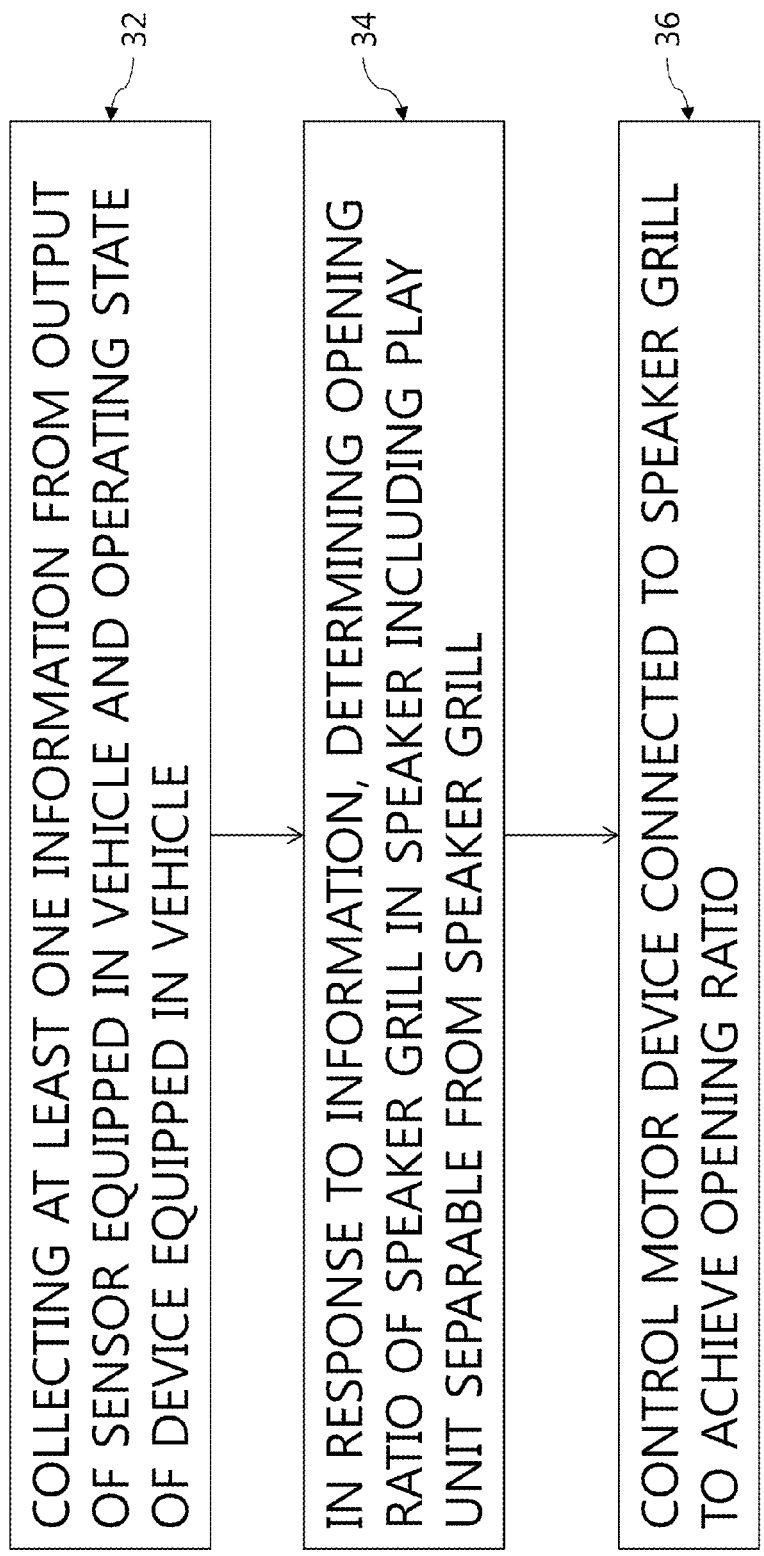
FIG. 5 is a flowchart describing a method of controlling a grill of a vehicle speaker.

FIG. 5 is a flowchart depicting a method of controlling a grill of a vehicle speaker.

As shown in FIG. 5, a method of controlling a grill of a speaker for a vehicle may include a step 32 of collecting at least one information from an output of a sensor installed in the vehicle and an operating state of a device installed in the vehicle, a step 34 of determining an opening ratio of a speaker grill in a speaker including a play unit separable from the speaker grill to correspond to the collected information, and a step 36 of controlling a motor device connected to the speaker grill to correspond to the opening ratio. In this case, the speaker installed in the vehicle may include the play unit configured to play audio and the speaker grill configured to protect the play unit. And, the speaker grill included in the speaker is designed to be movable instead of being designed to be stationary (i.e., built-in type).

The opening ratio of the speaker grill may be determined to increase or decrease in a preset range. And, the opening ratio may be adjusted toward a multi-step numerical value range in accordance with a structure of the speaker grill.

A plurality of sensors installed in the vehicle are usable to move the speaker grill automatically. For instance, it is possible to control a speaker grill using any one or more of a door sensor for sensing a door state of a vehicle, a collision sensor for determining a presence or non-presence of a collision of a vehicle, a humidity sensor for sensing humidity in a vehicle, a seating sensor for sensing whether a person is seated on a driver seat or the like, and the like. Meanwhile, a speaker grill can move in accordance with an operating state of a device installed in a vehicle. For instance, an engine-ignition status of a vehicle, operating state of a multitude of devices (e.g., convenience devices such as audio system, video system, navigation system, hands-free system, etc.) installed in a vehicle and the like can be used to control a speaker grill. Particularly, it is able to control the speaker grill using a presence or non-presence of an operation of a device related to output audio among a plurality of the devices installed in the vehicle.

For instance, the sensor installed in the vehicle may include a door sensor. In this case, information outputted through the door sensor may include at least one of a door-open signal, a door-closed signal, a door lock signal and a door unlock signal. In this case, the step 36 of controlling the motor device may include a step for the speaker grill to cover the play unit in response to at least one of the door-closed signal and the door lock signal and a step for the speaker grill to uncover the play unit in response to at least one of a door-open signal and a door unlock signal. For instance, if the door-open signal of the vehicle is activated, since dust and the like may flow into the vehicle, the speaker grill can cover an inside of the speaker. On the other hand, after a driver has got on the vehicle, if the door-closed signal is activated, since the driver can control audio to be outputted through an internal device of the vehicle, the speaker grill gets away from the play unit to enable the audio to carry better.

Moreover, the sensor installed in the vehicle may include a seating sensor. In this case, information outputted through the seating sensor may include at least one of a driver-seated signal and a passenger-seated signal. In this case, the step 36 of controlling the motor device may include a step for the speaker grill to uncover the play unit in case of activation of the driver-seated signal or the passenger-seated signal and a step for the speaker grill to cover the play unit in response to at least one of the door-closed signal and the door lock signal in case of deactivation of the driver-seated signal or the passenger-seated signal. For instance, if it is determined that a driver or a passenger is not in the vehicle through the seating sensor, possibility of using a speaker in the vehicle is considerably lowered. In this case, the speaker grill can cover an inside of the speaker (i.e., the speaker grill can be located over the play unit of the speaker).

The sensor installed in the vehicle may include a humidity sensor for measuring humidity in the vehicle. Information outputted through this sensor may include a humidity signal indicating that the measured humidity is equal to or greater than a reference amount. Since the speaker is a device sensitive to humidity, while humidity is high, it may not be preferable to expose an inside of the speaker by opening the speaker grill. This may correspond to a case that water flows in the speaker, a case that a window is open in a rainy weather, or the like. In this case, the step 36 of controlling the motor device may include a step for the speaker grill to separate from the play unit in case of deactivation of the humidity signal and a step for the speaker grill to cover the play unit in case of activation of the humidity signal.

Meanwhile, it is able to move a speaker grill in response to an operating state of a vehicle. The operating state of the vehicle may include at least one of OFF state, accessory driven state (ACC), electronic system driven state (ON), ignition state (IGN) and the like. In this case, the step 36 of controlling the motor device may include a step for the speaker grill to cover the play unit in response to the OFF state and a step for the speaker grill to separate from the play unit in response to at least one of the accessory driven state (ACC), the electronic system driven state (ON), and ignition state (IGN). The reason for this is described as follows. First of all, since internal devices for outputting audio among the devices installed in the vehicle are available since the accessory drive state (ACC), audio or sound can be outputted from the speaker.

In particular, an operating state of a device installed in the vehicle can be determined depending on whether an audio-video-navigation device equipped in the vehicle is in operation. In doing so, the step 36 of controlling the motor device may include a step for the speaker grill to cover the play unit in case of turning off the audio-video-navigation device and a step for the speaker grill to separate from the play unit in case of turning on the audio-video-navigation device. The audio-video-navigation device is just one representative example of a device installed in a head unit of the vehicle. And, a presence or non-presence of operation of a device for outputting audio among the devices installed in the vehicle can be used as a reference for moving the speaker grill.

The method of controlling the grill of the speaker for the vehicle may further include a step for the speaker grill to cover the play unit in case of occurrence of a preset situation despite that the speaker grill has got away from the play unit (not shown). In this case, the preset situation may include one of an emergency, an incident and the like. For instance, the preset situation may include at least one of a case that a door-open signal is activated in the course of driving a vehicle, a case that shock is sensed by a collision detection sensor installed in a vehicle, and a case that a signal of an airbag installed in a vehicle is activated.

Meanwhile, the step 36 of controlling the motor device may include a step of outputting energy in the form of direct motion or rotary motion to cause the movement of the speaker grill. This may be changed depending on a type of controlling the movement of the speaker grill.

Figure 6:
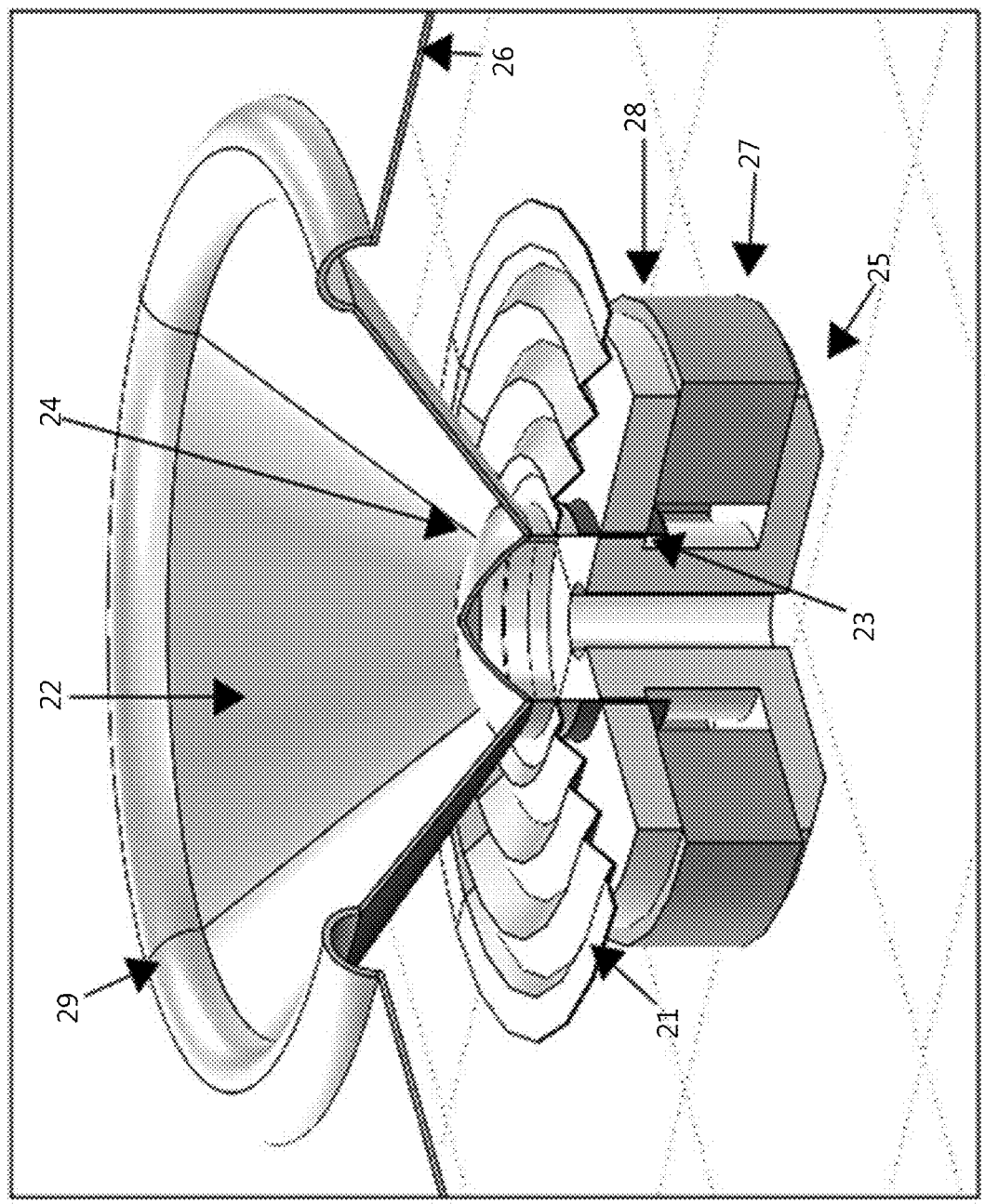
FIG. 6 is a diagram of a vehicle speaker.

FIG. 6 is a diagram of a vehicle speaker. In particular, a speaker installed in a vehicle may include a play unit for playing audio or sound and a speaker grill for protecting the play unit. The description with reference to FIG. 6 shall be made centering on the play unit.

As shown in FIG. 6, a play unit of a speaker may include a voice coil 23 playing a role as a source for speaker drive, a frame or baffle 26 enabling the speaker play unit to be installed in an enclosure, a surround or edge 29 configured to support a vibration plate (or cone) 22 and smoothen a reciprocating (e.g., piston-like) motion, a spider or damper 21 playing a role as a support device of the cone 22 together with the surround 29, a dust cap or dust dome 24 suppressing inflow of dust into the speaker by belong located at a right center of the cone 22, and the like. And, the play unit of the speaker may include top and bottom plates 28 and for controlling a flow of magnetic field created by a magnet 27.

The speaker means a device for generating sound by transforming electric energy received from an amplifier into vibration energy of the cone. The speaker mainly employs a structure of "dynamic" type using magnet according to the magnet development. The dynamic-type speaker outputs sound in a manner as follows. First of all, if an electric signal is inputted to the voice coil 23, magnetism is generated. Secondly, interaction of magnetic field between the magnets 27 enables the cone or diaphragm 22 to vibrate, whereby the sound is outputted. In particular, if alternate current (AC) signal is applied to the voice coil 23, the cone 22 performs piston motion to generate sound each time a direction of current flowing through the voice coil 23 changes alternately.

The speaker can be classified according to a shape of the cone or diaphragm 23 as follow. For instance, the speaker can be classified into one of a cone speaker in case of a cone shape, a dome speaker in case of a hemispherical shape of the cone, a flat speaker in case of a flat shape of the cone, a horn speaker having a relatively narrow play band despite capability of adjustment of directivity through a horn shape, and the like.

For instance, a cone-type speaker unit has a cone shape, a flat output sound pressure level, a directivity characteristic having a small level reduction in front or lateral side, and a relatively uniform impedance characteristic, thereby producing the most stable sound. If a speaker unit bore is big and a size of a cone type vibration plate is large, since a high frequency distortion factor characteristic moves toward a low frequency, it is good for playback of the lower register. Yet, when high-pitched sound is played, it is played in the middle register easily but failing to produce very clear sound. If a bore is small and a cone-type vibration plate size is small, a lowest resonant frequency is raised, a play range deviates toward a high side. Hence, the cone-type speaker unit is better for the upper register rather than for the lower register.

A flat-type speaker unit is a unit designed flat and has a voice coil attached to a vibration plate directly. The reason for this is that a location of the voice coil can be easily set equal to that of a woofer (for lower register), a midrange (for middle register) or a tweeter (for upper register). This may be advantageous in adjusting phase characteristics unlike a other conventional speakers.

A condenser speaker unit is called an electrostatic type and classified into a single type or a push-pull type. It requires a transformer to match input impedance and frequently needs an external power. The reason for this is that the condenser speaker unit can be driven only if a high bias voltage is applied.

A ribbon-type speaker unit has a fine sound quality characteristic when sound is played, is widely used for a tweeter in the upper register, and has a feature of front drive.

A dome-type speaker unit is characterized in that a played sound quality is evenly spread and is widely used for a unit for the middle or upper register. This is basically prepared in the same state of the cone type and formed of special metal such as aluminum, beryllium, titanium and the like. This is called a hard dome. If the dome-type speaker unit is manufactured in a manner of attaching plastics to fabric, it is called a soft dome type.

Meanwhile, a speaker unit installed in a speaker enclosure can be classified into a unit for the lower register, a unit for the upper register, a unit for the middle register, or the like. The lower register unit is generally called a woofer, has a size considerably larger than those of other speaker units, and produces low-pitched sound. This woofer covering a low-pitched band produces sounds of contrabass, organ and the like and is normally installed in a bottom side of the enclosure. Meanwhile, the upper register unit in charge of high-pitched sound is called a tweeter and used to play high-pitched sounds of musical instruments such as violin, piccolo and the like. Since the tweeter has a bore smaller than those of other speaker units, it is good for the play in the upper register. An ideal size of the tweeter ranges 1.0~1.5 inch. If a size of the tweeter gets greater than the ideal size, since it causes problems of frequency characteristics or directivity, it is not appropriate for the play of high-pitched sound. The tweeter is generally installed in a manner of being fixed to an upper part of the enclosure. The tweeter normally has frequency reproduction capability (500 Hz~20 KHz). A tweeter capable of reproduction over 20 KHz is called a super tweeter.

A dome-type speaker is used for the play on high frequency without distortion, used for high-end speakers popularly, and has good directivity to produce sound better than that of the cone type despite being located in a considerable distance. A ribbon-type tweeter has a ribbon shape and is characterized in providing smooth feeling up to frequencies over audible bands with ease. Since the ribbon-type tweeter moves air directly, it has excellent transient characteristic and its vibration plate is driven in front. Meanwhile, a horn-type tweeter is a tweeter in a horn shape and has good sound quality property. The horn-type tweeter is manufactured in a manner of attaching a horn to a small unit.

Figure 7:
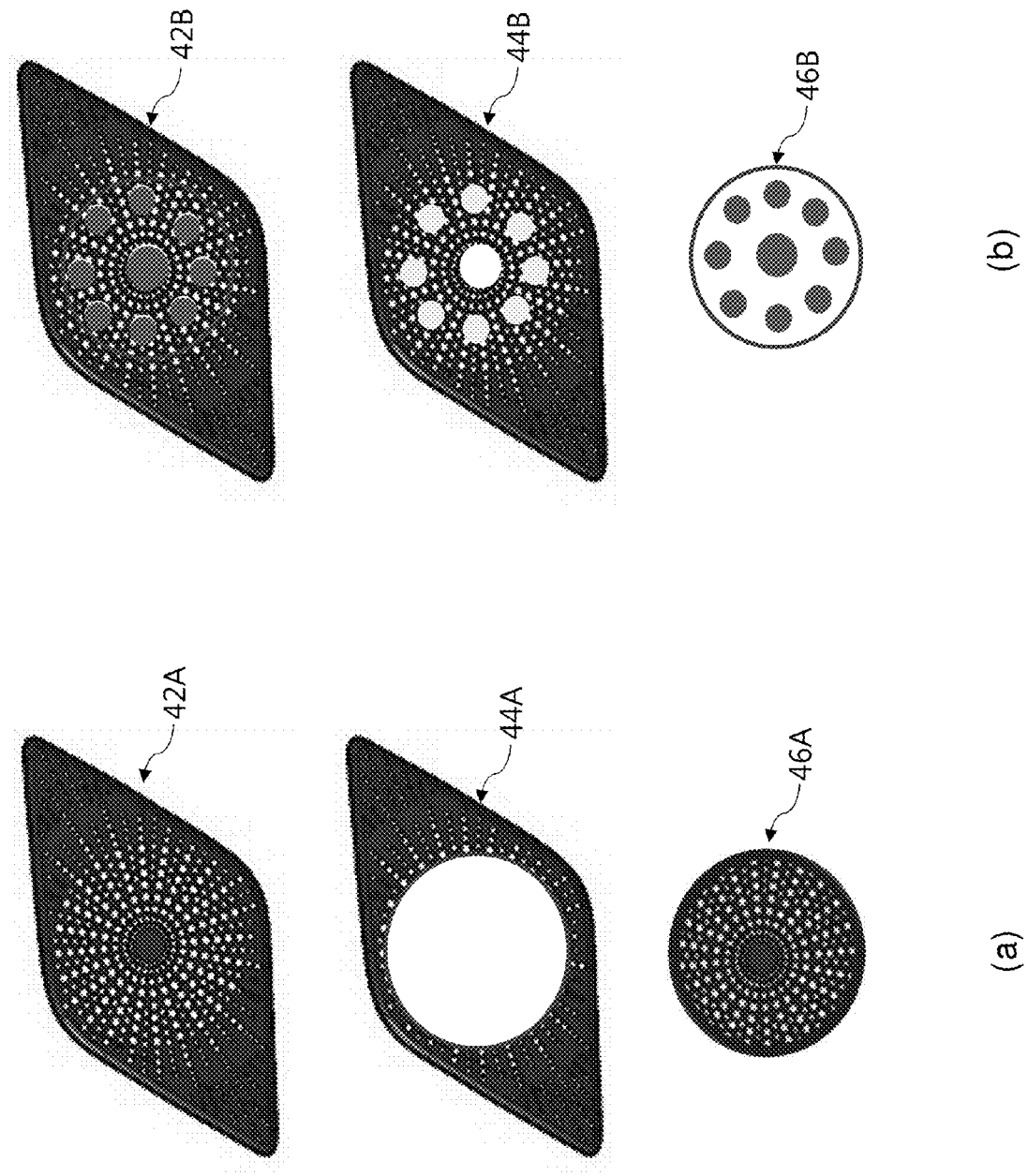
FIG. 7 is a diagram of a vehicle speaker grill.

FIG. 7 is a diagram of a vehicle speaker grill. In particular, (a) of FIG. 7 is a diagram to describe a structure capable of adjusting to increase an opening ratio of a speaker grill. And, (b) of FIG. 7 is a diagram to describe a structure capable of adjusting to decrease an opening ratio of a speaker grill more or less.

As shown in FIG. 7, a speaker grill 42A/42B may include a speaker installation region of a speaker in a vehicle, an outer region 44A/44B corresponding to a frame having a play unit installed therein, and a center region 46A/46B corresponding to an upper part of the play unit in the frame. In this case, the outer region 44A/44B and the center region 46A/46B of the speaker grill 42A/42B can be separated from each other.

The center region 46A/46B can move in response to energy of one of direct motion and rotary motion of a motor device. The center region 46A/46B includes at least one slice and can move by a sliding door system, a blind system, a revolving door system, or the like. For instance, for the movement of the center region 46A/46B, it is able to use a sliding rail, a rotating roller, a drum/wire, or the like.

For instance, if a play unit in a speaker outputs audio, the center region 46A/46B gets away from a top side of the play unit. If the play unit does not output the audio, the center region 46A/46B can be located over the play unit. Through this, if the center region 46A/46B is located over the play unit, an opening ratio of a speaker grill is 50% or less. If the center region 46A/46B gets away from the top side of the play unit, the opening ratio of the speaker grill is unable to exceed 50%. For instance, referring to (a) of FIG. 7, if the center region 46A moves, the play unit of the speaker may be exposed 100% through the inner holes of the outer region 44A. In this case, the opening ratio of the center region 46A may be low. On the other hand, referring to (b) of FIG. 7, if the center region 46B moves, although the play unit of the speaker is not exposed 100%, as an opening ratio of the outer region 44B is high, the opening ratio of the speaker grill may be raised.

Figure 8:
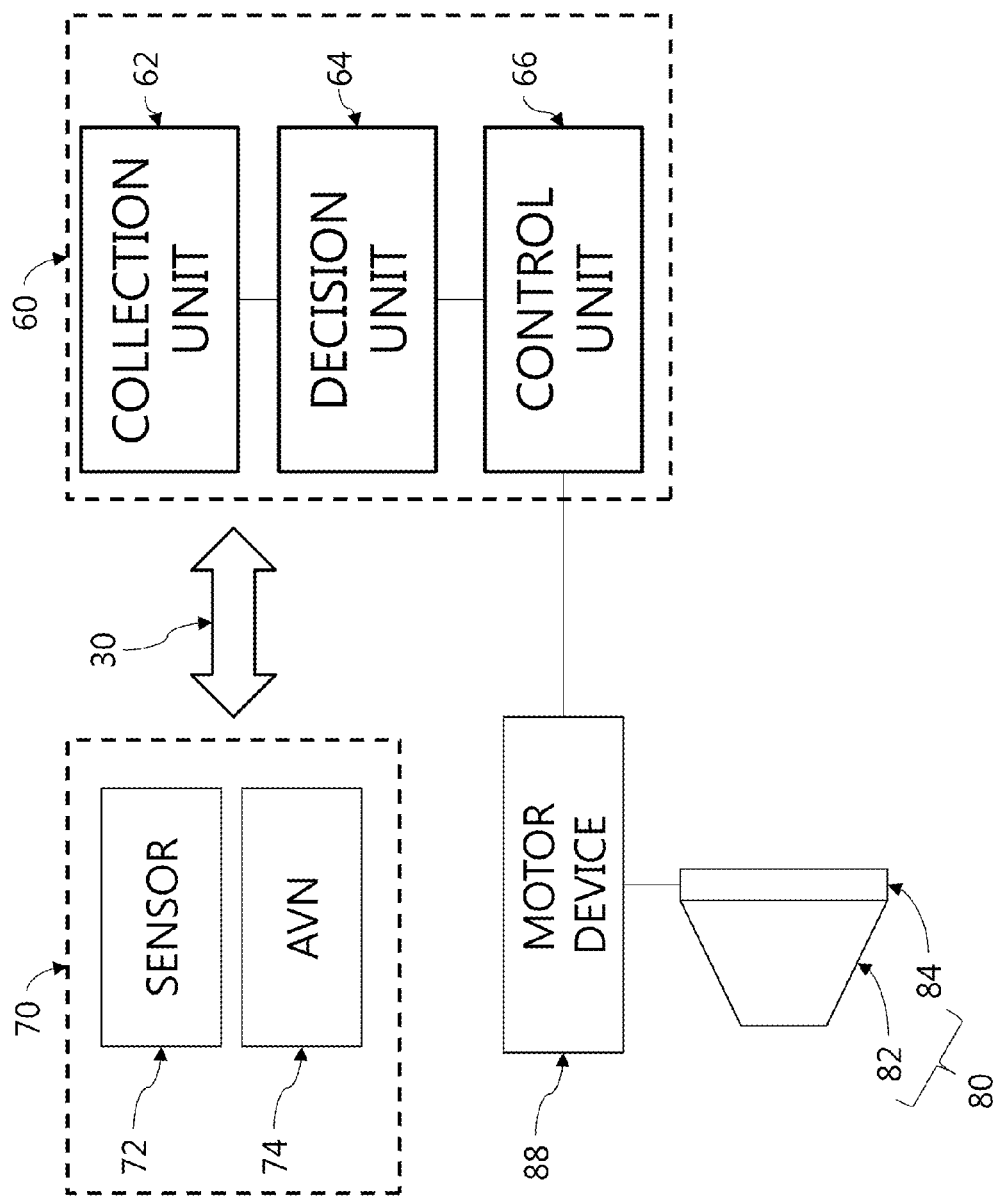
FIG. 8 is a block diagram of a vehicle speaker grill control device.

FIG. 8 is a block diagram of a vehicle speaker grill control device.

As shown in FIG. 8, an electronic system 70 having a multitude of devices installed in a vehicle may include various sensors 72 and a plurality of devices (e.g., an audio-video-navigation device 74). The electronic system 70 can interwork with a grill control device 60 of a vehicle speaker through a vehicle network 30. The grill control device 60 of the vehicle speaker may include a collection unit 62 configured to collect at least one information from an output of a sensor installed in the vehicle and an operating state of a device installed in the vehicle, a decision unit 64 configured to determine an opening ratio of a speaker grill 84 in a speaker 80 including a play unit 82 separable from the speaker grill 84 to correspond to the collected information, and a control unit 66 configured to control a motor device 88 connected to the speaker grill 84 to correspond to the opening ratio. The grill control device 60 of the vehicle speaker is connected to the motor device 88 in charge of the movement of the speaker grill 84, and the motor device 88 is connected to the speaker grill 84. The vehicle speaker 80 may include the play unit 82 configured to play audio and the speaker grill 84 configured to protect the play unit 82.

The opening ratio of the speaker grill, which is determined by the decision unit 64, may be determined to increase or decrease in a preset range. And, the opening ratio may be adjusted toward a multi-step numerical value range in accordance with a structure of the speaker grill.

For instance, the sensor 72 may include a door sensor. In this case, information outputted through the door sensor may include at least one of a door-open signal, a door-closed signal, a door lock signal and a door unlock signal. The door-open signal, the door-closed signal, the door lock signal, the door unlock signal and the like are collected through the collection unit 62. And, the decision unit 64 determines the movement of the speaker grill. According to such a determination, the control unit 66 can instruct the motor device 88 to enable the speaker grill 84 to cover the play unit 82 in response to at least one of the door-closed signal and the door lock signal. And, the control unit 66 can instruct the motor device 88 to enable the speaker grill 84 to separate from a top side of the play unit 82 in response to at least one of the door-open signal and the door unlock signal.

The sensor 72 may include a seating sensor. In this case, information outputted through the seating sensor may include at least one of a driver-seated signal and a passenger-seated signal. Such signals can be collected by the collection unit 62. The decision unit 64 determines the movement of the speaker grill in response to the signal delivered by the collection unit 62. According to such a determination, the control unit 66 can instruct the motor device 88 to enable the speaker grill 84 to separate from the top side of the play unit 82 if the driver-seated signal or the passenger-seated signal is activated. And, the control unit 66 can instruct the motor device 88 to enable the speaker grill 84 to cover the play unit 82 if the door-closed signal or the passenger-seated signal is deactivated.

The sensor 72 may include a humidity sensor for measuring humidity in the vehicle. Information outputted through this sensor may include a humidity signal indicating that the measured humidity is equal to or greater than a reference. The humidity signal is collected by the collection unit 62, and the decision unit 64 determines the movement of the speaker grill in response to the humidity signal. According to such determination, if the humidity signal is deactivated, the control unit 66 can instruct the motor device to enable the speaker grill 84 to separate from the top side of the play unit 82. Moreover, if the humidity signal is activated, the control unit 66 can instruct the motor device 88 to enable the speaker grill 84 to cover the play unit 82.

An operating state of the vehicle may include at least one of OFF state, accessory driven state (ACC), electronic system driven state (ON), ignition state (IGN) and the like. The operating state of the vehicle is determined by the collection unit 62, and the decision unit 64 can determine the movement of the speaker grill. According to such determination, the control unit 66 can instruct the motor device 88 to enable the speaker grill 84 to cover the play unit 82 in response to the OFF state. Moreover, the control unit 66 can instruct the motor device 88 to enable the speaker grill 84 to separate from the top side of the play unit 82 in response to at least one of the accessory driven state (ACC), the electronic system driven state (ON), and the ignition state (IGN).

Moreover, the movement of the speaker grill 84 can be determined based on whether an audio-video-navigation (AVN) device 74 is in operation. The collection unit 62 can recognize whether the AVN device 74 is in operation. And, the decision unit 64 can determine the movement of the speaker grill 84 in response to whether the AVN device 74 is in operation. According to such determination, the control unit 66 can instruct the motor device 88 to enable the speaker grill 84 to cover the play unit 82 if the audio-video-navigation device 74 is turned off. And, the control unit 66 can instruct the motor device 88 to enable the speaker grill 84 to separate from the top side of the play unit 82 if the audio-video-navigation device 74 is turned on.

Meanwhile, although the speaker grill 84 has separated from the top side of the play unit 82, if a preset (or predetermined) condition occurs, the control unit 66 can instruct the motor device 88 to enable the speaker grill 84 to cover the play unit 82. The preset situation can be obtained by the collection unit 62. For instance, the preset situation may include at least one of a case that a door-open signal is activated in the course of driving a vehicle, a case that shock is sensed by a collision detection sensor installed in a vehicle, and a case that a signal of an airbag installed in a vehicle is activated. In the aforementioned case, the decision unit 64 can determine the movement for enabling the speaker grill 84 to cover the play unit 82. And, the control unit 66 can deliver a corresponding instruction to the motor device 88.

For the movement of the speaker grill 84, the motor device 88 can output energy in the form of direct motion or rotary motion.

Meanwhile, the collection unit 62, the decision unit 64 and the control unit 66 can be embodied through a microprocessor installed in the vehicle and may interwork with a vehicle gateway, a power control device, a vehicle head unit and the like.

Figure 9:
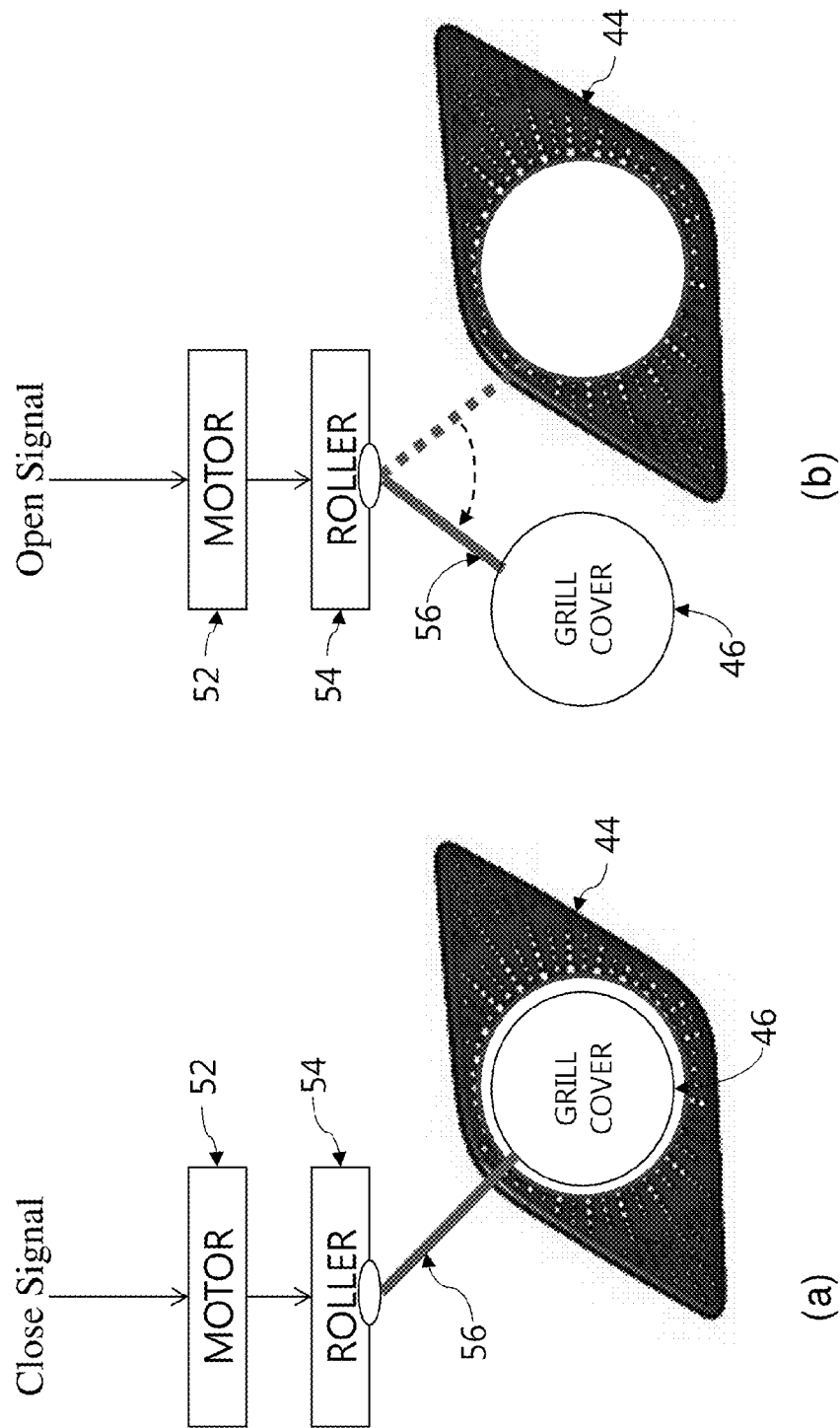
FIG. 9 is a diagram describing a first motor device for controlling a vehicle speaker grill.

FIG. 9 is a diagram depicting a first motor device for controlling a vehicle speaker grill. In particular, (a) of FIG. 9 is a diagram depicting a case for a speaker grill to cover a play unit. And, (b) of FIG. 9 is a diagram depicting a case for a speaker grill to uncover or expose a play unit.

For instance, signals delivered from a grill control device of a vehicle speaker may include an open signal and a close signal. If the open signal or the close signal is delivered to the motor 52, the motor 52 outputs kinetic energy. In response to the kinetic energy, a roller 54 can move in a designed direction.

Referring to (a) of FIG. 9, in response to a close signal, a center region 46 of a speaker grill cuts off an inner hole of an outer region 44. Referring to (b) of FIG. 9, if an open signal is delivered, the roller 54 moves a shaft 56 connected to the center region 46 in a preset direction (e.g., counter-clockwise). The center region 46 connected to the shaft 56 is placed at a location out of the outer region 44. And, an inside (e.g., a play unit) of a speaker blocked by the center region 46 can be exposed. If the close signal is delivered, the roller 54 is driven to move the shaft 56 in a reverse direction.

Figure 10:
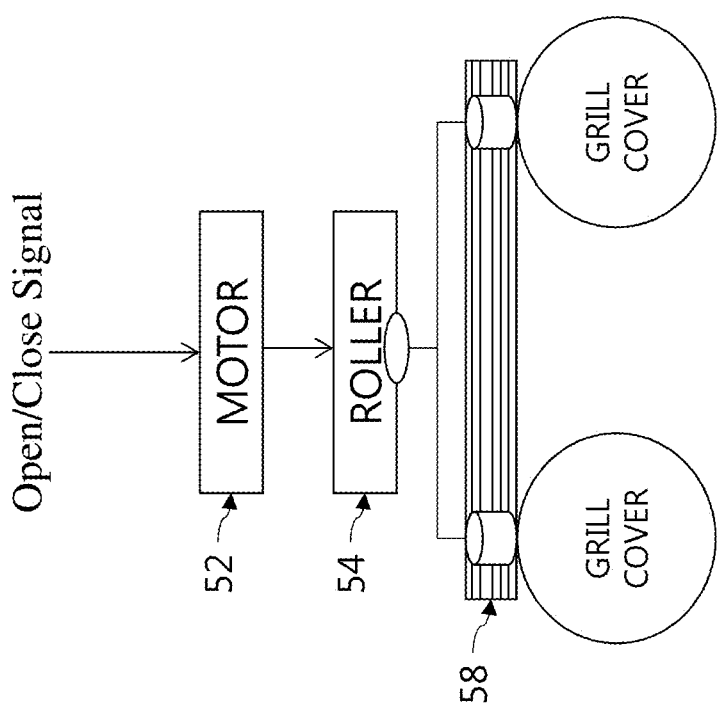
FIG. 10 is a diagram describing a second motor device for controlling a vehicle speaker grill.

FIG. 10 is a diagram depicting a second motor device for controlling a vehicle speaker grill.

As shown in FIG. 10, a second motor device can control a center region moved by a sliding rail 58. If an open/close signal is delivered, a motor 52 outputs kinetic energy. In response to the kinetic energy, the roller 54 can move the grill cover between a first location (shown at bottom left) and a second location (shown at bottom right).

As mentioned in the foregoing description, the present disclosure can provide a control device enabling a speaker grill to be automatically opened/closed. In order to determine an opening or closing of the speaker grill, various conditions can be considered. For instance, a vehicle door opening is set to a reference for the determination. Since a speaker is a part used at the timing point of outputting sound, a presence or non-presence (ACC PN) of operability of an accessory can be set as a reference for the determination of the opening. On the other hand, if a humidity state in a vehicle including the speaker is sensed, the sensed humidity state can be utilized as a closing condition of the speaker grill. Moreover, if a vehicle network is activated, it is able to open the speaker grill. If an engine starts or a signal (e.g., a keyless entry signal) related to boarding of a driver is generated, it is able to open the speaker grill.

It will be appreciated by those skilled in the art that various modifications and variations can be made in the present disclosure without departing from the spirit or scope of the disclosure. Thus, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A method of controlling a speaker grill of a speaker including a play unit separable from the speaker grill in a vehicle, comprising:
   collecting, by a collection unit, at least one of information outputted by a sensor equipped in the vehicle and information indicating an operating state of a device equipped in the vehicle;
   determining, by a decision unit, an opening ratio of the speaker grill of the speaker based on the collected information; and
   controlling, by a control unit, a motor device coupled to the speaker grill to achieve the opening ratio,
   wherein the controlling of the motor device comprises:
      automatically controlling the speaker grill to cover the play unit when an audio-video-navigation device equipped in the vehicle is turned off; and
      automatically controlling the speaker grill to separate from a top of the play unit when the audio-video-navigation device is turned on.

2. The method of claim 1, wherein:
   the sensor includes a door sensor, and
   information outputted by the door sensor includes at least one of a door-open signal, a door-closed signal, a door lock signal, and a door unlock signal.

3. The method of claim 2, wherein the controlling of the motor device comprises:
   controlling the speaker grill to cover the play unit in response to collecting at least one of the door-closed signal and the door lock signal; and
   controlling the speaker grill to separate from a top of the play unit in response to collecting at least one of the door-open signal and the door unlock signal.

4. The method of claim 1, wherein:
   the sensor includes a seating sensor, and
   information outputted by the seating sensor includes at least one of a driver-seated signal and a passenger-seated signal.

5. The method of claim 4, wherein the controlling of the motor device comprises:
   controlling the speaker grill to separate from a top of the play unit when the driver-seated signal or the passenger-seated signal is activated; and
   controlling the speaker grill to cover the play unit when the driver-seated signal or the passenger-seated signal is deactivated.

6. The method of claim 1, wherein:
   the sensor includes a humidity sensor configured to measure humidity in the vehicle, and
   information outputted by the humidity sensor includes a humidity signal indicating that the measured humidity is greater than or equal to a reference amount.

7. The method of claim 6, wherein the controlling of the motor device comprises:
   controlling the speaker grill to separate from a top of the play unit when the humidity signal is deactivated; and
   controlling the speaker grill to cover the play unit when the humidity signal is activated.

8. The method of claim 1, wherein the operating state of the device includes at least one of an OFF state, an accessory driven state (ACC), an electronic system driven state (ON), and an ignition state (IGN).

9. The method of claim 8, wherein the controlling of the motor device comprises:
   controlling the speaker grill to cover the play unit in response to determining that the device is in the OFF state; and
   controlling the speaker grill to separate from a top of the play unit in response to determining that the device is in at least one of the accessory driven state (ACC), the electronic system driven state (ON), and the ignition state (IGN).

10. The method of claim 1, further comprising controlling the speaker grill to cover the play unit when a predetermined situation occurs even though the speaker grill has been separated from a top of the play unit.

11. The method of claim 10, wherein the predetermined situation includes at least one of a case that a door-open signal is activated during driving of the vehicle, a case that shock is sensed by a collision detection sensor installed in the vehicle, and a case that a signal of an airbag installed in the vehicle is activated.

12. The method of claim 1, wherein the controlling of the motor device comprises:
   outputting energy in a form of direct motion or rotary motion to cause movement of the speaker grill.

13. An apparatus of controlling a speaker grill of a speaker including a play unit separable from the speaker grill in a vehicle, comprising:
   a collection unit collecting at least one of information outputted by a sensor equipped in the vehicle and information indicating an operating state of a device equipped in the vehicle;

a decision unit determining an opening ratio of the speaker grill of the speaker based on the collected information; and a control unit controlling a motor device coupled to the speaker grill to achieve the opening ratio, wherein the control unit automatically controls the speaker grill to cover the play unit when an audio-video-navigation device equipped in the vehicle is turned off and automatically controls the speaker grill to separate from a top of the play unit when the audio-video-navigation device is turned on.

14. An apparatus of claim 13, wherein:

the sensor includes at least one of a door sensor and a seating sensor, the control unit controls the speaker grill to cover the play unit in response to collecting at least one of a door-closed signal and a door lock signal and controls the speaker grill to separate from a top of the play unit in response to collecting at least one of a door-open signal and a door unlock signal, and the control unit controls the speaker grill to separate from the top of the play unit when a driver-seated signal or a passenger-seated signal is activated and control the speaker grill to cover the play unit the driver-seated signal or the passenger-seated signal is deactivated.

15. The apparatus of claim 13, wherein:

the sensor includes a humidity sensor configured to measure humidity in the vehicle, and information outputted by the humidity sensor includes a humidity signal indicating that the measured humidity is greater than or equal to a reference amount.

16. An apparatus of controlling a speaker grill of a speaker including a play unit separable from the speaker grill in a vehicle, comprising:

a collection unit collecting at least one of information outputted by a sensor equipped in the vehicle and information indicating an operating state of a device equipped in the vehicle;

a decision unit determining an opening ratio of the speaker grill of the speaker based on the collected information; and a control unit controlling a motor device coupled to the speaker grill to achieve the opening ratio, wherein the operating state of the device includes at least one of an OFF state, an accessory driven state (ACC), an electronic system driven state (ON), and an ignition state (IGN), and the control unit automatically controls the speaker grill to cover the play unit in response to determining that the device is in the OFF state, and automatically controls the speaker grill to separate from a top of the play unit in response to determining that the device is in at least one of the accessory driven state (ACC), the electronic system driven state (ON), and the ignition state (IGN).

17. The apparatus of claim 13, wherein:

the control unit controls the speaker grill to cover the play unit when a predetermined condition occurs even though the speaker grill has been separated from a top of the play unit, information indicating the predetermined situation is collected by the collection unit, and the predetermined situation includes at least one of a case that a door-open signal is activated during driving of the vehicle, a case that shock is sensed by a collision detection sensor installed in the vehicle, and a case that a signal of an airbag installed in the vehicle is activated.

* * * * *